US007008166B1

(12) United States Patent
Grimes

(10) Patent No.: US 7,008,166 B1
(45) Date of Patent: Mar. 7, 2006

(54) DOOR LIFTING APPARATUS AND METHOD

(75) Inventor: Mark Grimes, Centre, AL (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/455,474

(22) Filed: Jun. 5, 2003

(51) Int. Cl.
*B65G 1/00* (2006.01)

(52) U.S. Cl. ........................ 414/663; 269/17; 269/905; 254/114

(58) Field of Classification Search ................ 414/444, 414/648, 663; 187/244, 334, 335, 401, 402; 254/8 R, 8 B, 8 C, 9 B, 9 C, 10 R, 10 B, 254/10 C, 88, 106, 112, 114, 116, 115, 118, 254/133 R, 134, 2 R, 2 B; 29/281.1, 281.5; 269/905, 55–56, 58–59, 62, 66, 900, 901
See application file for complete search history.

(56) References Cited

U.S. PATENT DOCUMENTS 1,502,854 A * 7/1924 Hutchinson ............. 254/133 R
1,663,571 A * 3/1928 Shedd ........................... 298/2
2,798,232 A * 7/1957 Tore ................................ 5/11
3,643,935 A * 2/1972 Bell ............................ 269/16
3,806,090 A * 4/1974 Sasnett et al. ............ 254/10 R
3,892,385 A * 7/1975 Andrist et al. .......... 254/133 R
3,958,793 A * 5/1976 Garate ...................... 254/10 B
4,042,208 A 8/1977 Arakaki
4,138,099 A * 2/1979 Englehart .................... 269/17
4,176,831 A * 12/1979 Adams ........................ 269/17
4,180,252 A * 12/1979 Cushenbery ................. 269/17
4,183,511 A * 1/1980 Marek ......................... 269/17
4,278,244 A * 7/1981 Carter ......................... 269/17
4,456,421 A 6/1984 Robson
4,530,492 A * 7/1985 Bork ........................... 269/17
4,531,720 A * 7/1985 Soder .......................... 269/71
4,746,141 A * 5/1988 Willis ......................... 280/655
4,810,151 A * 3/1989 Shern .......................... 414/11
4,838,199 A * 6/1989 Weber ........................ 118/500
4,876,786 A * 10/1989 Yamamoto et al. ........... 29/429
4,932,639 A * 6/1990 Fjellstrom .................... 269/17
4,961,257 A * 10/1990 Sakamoto et al. ............ 29/823
5,009,406 A * 4/1991 McDermott .................. 269/17
5,040,290 A * 8/1991 Usui et al. .................... 29/787
5,123,803 A * 6/1992 Crabtree ..................... 414/621
5,135,205 A * 8/1992 Bedard ........................ 269/17
5,181,307 A 1/1993 Kitahama et al.
5,244,221 A * 9/1993 Ward ......................... 280/79.7
5,269,501 A * 12/1993 Liegel et al. ................. 269/17
5,299,659 A * 4/1994 Imbeault et al. ............ 414/592
5,551,980 A * 9/1996 Turnbo ....................... 118/500
5,725,205 A * 3/1998 O'Berg ........................ 269/37
5,762,348 A * 6/1998 Echternacht ............... 280/79.7
5,915,742 A * 6/1999 Hung ........................ 29/281.5

(Continued)

*Primary Examiner*—Kathy Matecki
*Assistant Examiner*—Rashmi Sharma
(74) *Attorney, Agent, or Firm*—Rankin, Hill, Porter & Clark LLP; Vincent Ciamacco

(57) ABSTRACT

A door lifting apparatus includes a frame and a lift mechanism. The lift mechanism includes a slide and a lever. The slide includes a plurality of holders and a plurality of glides, wherein the holders are operable to engage and support a door while the glides cooperate with rails provided upon the frame to guide the slide along the rails. Pivotal movement of the lever moves the slide vertically relative to the upright supports, thereby raising or lowering the door.

5 Claims, 3 Drawing Sheets

U.S. PATENT DOCUMENTS

| | | | | |
|---|---|---|---|---|
| 6,024,348 | A * | 2/2000 | Ventura et al. | 269/17 |
| 6,024,351 | A * | 2/2000 | Metoyer | 269/133 |
| 6,199,849 | B1 * | 3/2001 | Lebwohl et al. | 269/37 |
| 6,296,239 | B1 * | 10/2001 | Sawyer | 269/17 |
| 6,298,536 | B1 * | 10/2001 | Rossway et al. | 29/281.1 |
| 6,409,455 | B1 * | 6/2002 | Moseley | 414/495 |
| 6,439,561 | B1 * | 8/2002 | Ausilio | 269/47 |
| 6,505,844 | B1 * | 1/2003 | Hallman et al. | 280/79.7 |
| 6,579,051 | B1 * | 6/2003 | Echternacht | 414/11 |
| 6,643,905 | B1 * | 11/2003 | Rhoads et al. | 29/407.09 |
| 6,708,393 | B1 * | 3/2004 | Roy et al. | 29/714 |
| 6,711,800 | B1 * | 3/2004 | Savoy | 29/434 |

* cited by examiner

FIG. 3
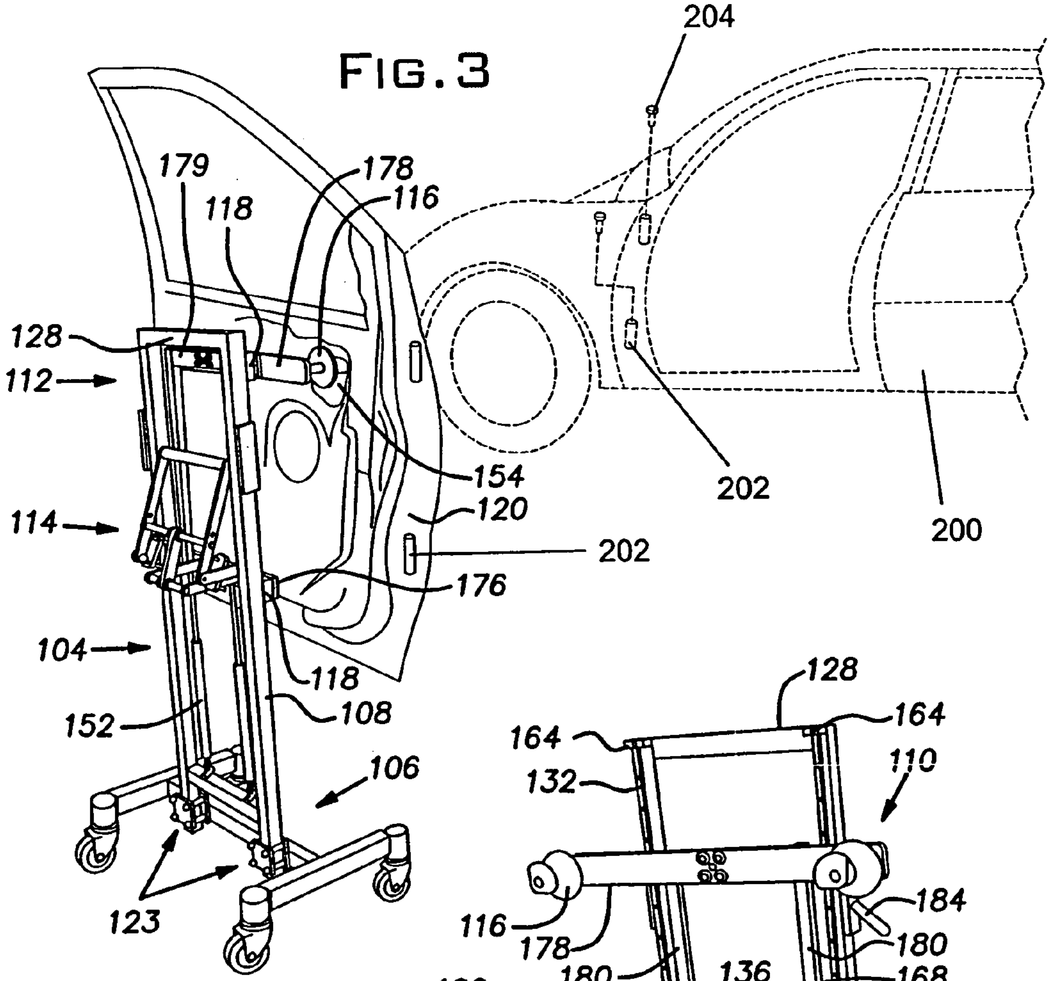
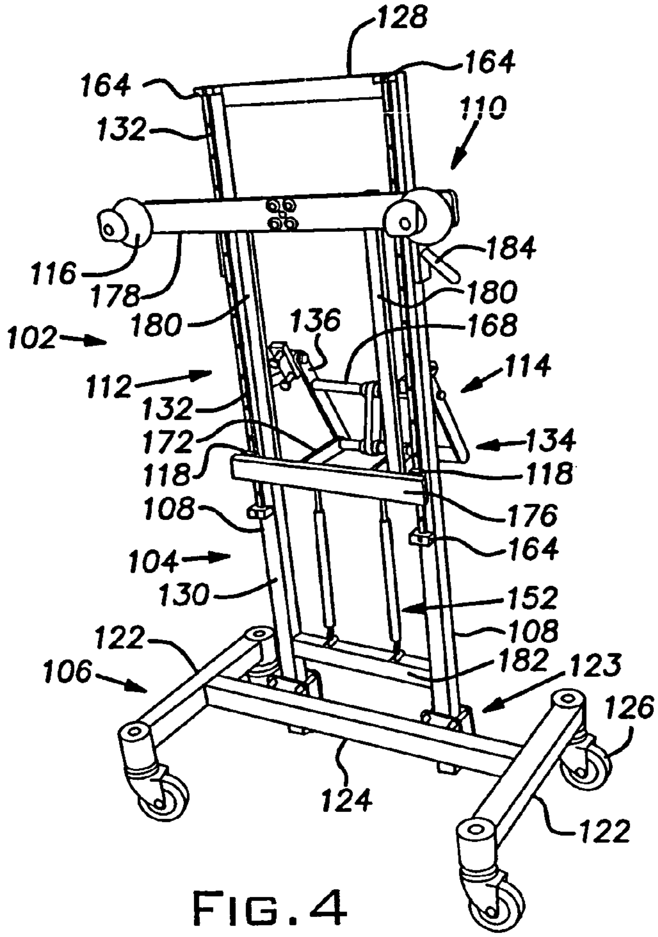
FIG. 4

DOOR LIFTING APPARATUS AND METHOD

BACKGROUND OF THE INVENTION

1. Field of the Invention

The present invention generally relates to an apparatus for lifting a door, and more particularly, toward an apparatus for lifting and transporting an automobile door.

2. Description of Related Art

During the manufacture of a vehicle, it may be necessary to remove a vehicle door and transport the door to another location for subsequent assembly before reattaching the door to the vehicle. As vehicle doors are usually heavy, apparatuses that can assist in the lifting and transport of vehicle doors are often employed for this task. Several apparatuses are currently used for such purposes. However, these apparatuses can be expensive to purchase and maintain, and can be cumbersome to operate.

One such apparatus employs a pneumatic assist arm attached to a door holding apparatus. The assist arm extends from an overhead support assembly, and the lifted door hangs in the air once it is removed from the vehicle. While such devices work satisfactorily, they require significant expenditures to install and maintain, and are not readily adaptable to changes in the assembly layout.

Therefore, there exists a need in the art for a door lifting apparatus with a simple design having ergonomic benefits and requiring little maintenance. There also exists a need for a compact door lifting apparatus that is simple to operate and maneuverable in limited access areas.

SUMMARY OF THE INVENTION

The present invention is directed toward an apparatus and method for lifting and transporting a vehicle door. In accordance with the present invention, a door lifting apparatus has a frame with a pair of upright supports and a rail extending along each upright support. A lift mechanism, which includes a slide and a lever, is mounted on the frame. The slide includes a plurality of holders and a plurality of glides. The holders are operable to engage and support a door, while the glides guide the slide along the rails. The lever is secured to the slide so that pivotal movement of the lever moves the slide vertically along the rails and relative to the upright supports. The apparatus further includes a biasing device extending between the frame and the slide and serving to assist in lifting and lowering the door.

In accordance with the inventive method of lifting and supporting a door, the lever is operated to move the slide into an insertion position in which the holders are aligned with openings formed in the door. The hinge pins are removed from the door, and the door is removed from the vehicle. The lifted door may be transported by simply pushing the door lifting apparatus across a floor. When at a desired location, the lever may be pivoted so as to move the slide vertically downward from the lifted position, thereby lowering the holders and the door into a lowered position.

In further accordance with the inventive method, once the holders are inserted into the door openings, the lever is pivoted to move the slide vertically upward from the insertion position, thereby raising the holders and the door into a lifted position wherein the door is engaged with, and supported by, the apparatus.

BRIEF DESCRIPTION OF THE DRAWINGS

These and further features of the invention will be apparent with reference to the following description and drawings, wherein:

FIG. 3 is a perspective view of a rear and left side of the door lifting apparatus according to the present invention, with a door disposed thereon and held in a lifted position;

FIG. 4 is a perspective view of a front and right side of the door lifting apparatus according to the present invention;

DETAILED DESCRIPTION OF THE PREFERRED EMBODIMENTS

Figure 1:
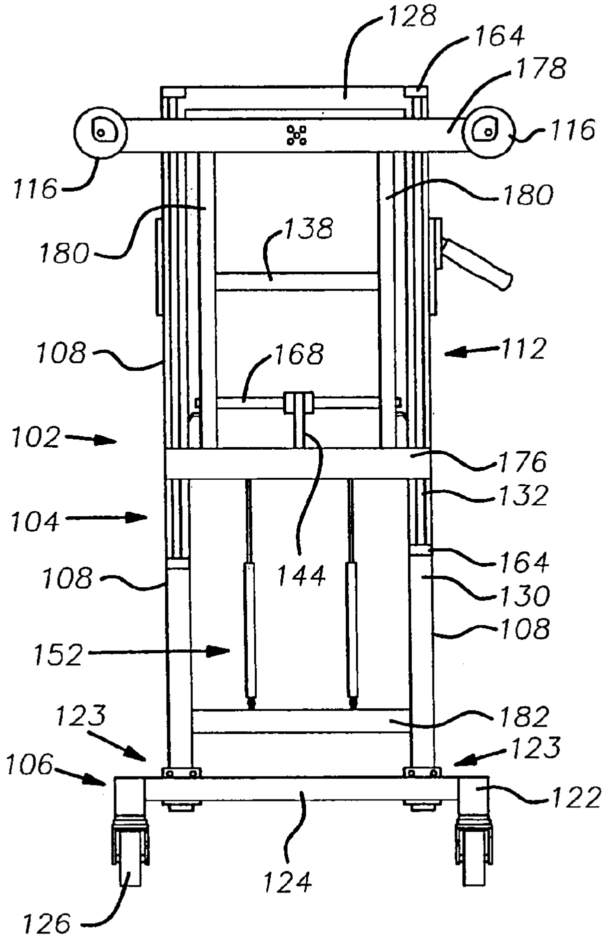
FIG. 1 is a front elevational view of the door lifting apparatus according to the present invention.

With reference to the drawing figures, a door lifting and transporting apparatus 102, which is operable to lift and support a vehicle door 120, includes a frame 104 and a lift mechanism 110. The frame includes a base 106, a pair of upright supports 108, an upper support 128, and a lower support 182.

The base 106 includes a pair of support bars 122 that are interconnected by a cross bar 124. Each support bar 122 has a caster or wheel secured to each end thereof. The cross bar 124 is secured to the support bars 122 at location that is offset from the midpoint of the support bars 122, as illustrated.

A bottom end of each upright support 108 is adjustably secured to the cross bar 124, while a top end of each upright support 108 is rigidly interconnected by the upper support 128. A lower support 182 extends between and rigidly interconnects the upright supports 108 at a location vertically spaced from the base 106, as illustrated. The upper and lower supports 128, 182 are parallel to the cross bar 124. A clamping assembly 123 is provided to secure the bottom end of the upright supports 108 to the cross bar 124. The clamping assembly 123 includes a backing plate and a clamping plate. The backing plate is permanently affixed to the cross bar 124. The clamping plate is mounted over the lower end of the associated upright support 108 and aligned with the backing plate, as illustrated. Bolts extend through the plates and are tightened to clamp the upright support 108 to the cross bar 124. As will be appreciated, the clamping assembly 123 permits the height of the apparatus to be adjusted, as may be necessary to accommodate doors 120 for different model cars.

Each upright support 108 has a front face 130, and a bar-like rail 132 extending along the front face 130. Each rail 132 is attached to the front face 130 of the associated upright support 108 at numerous locations along its length by conventional mechanical fasteners. Glides 118 are secured to each rail 132 and slidably move along the rails 132. Suitable glide and rail subassemblies are available from Rollmann Trading Company of Bangalore, India under the tradename "THK" (www.rollmannbearing.com). Upper and lower stops 164 are provided at the upper and lower ends of the rails 132, as shown best in FIGS. 2 and 4, and serve to limit the range of vertical motion of the lifting apparatus.

A pair of rearwardly extending first brackets 142 is affixed to, and extends rearwardly from, the upright supports 108 at a location intermediate the upper and lower mounts 164. Each of the first brackets 142 have a proximal end that is affixed to an inner surface of an associated upright support 108 and a distal end that pivotally supports a lever 114 of the lift mechanism 110, as will be described more fully hereinafter.

Figure 2:
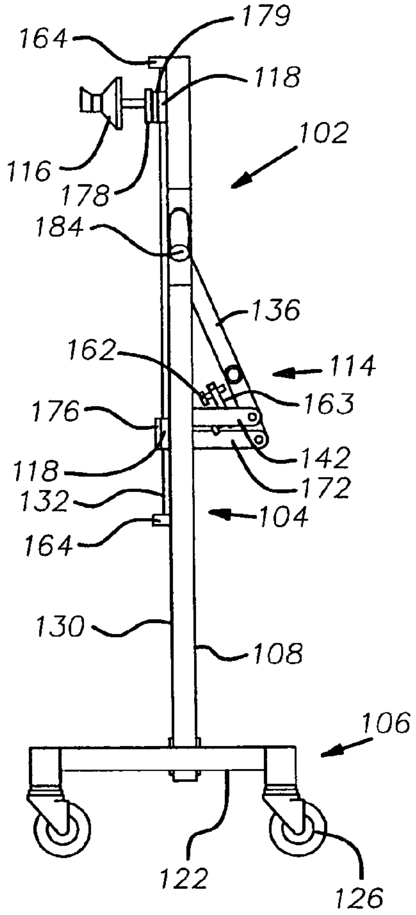
FIG. 2 is a right side elevational view of the door lifting apparatus according to the present invention.
Figure 6:
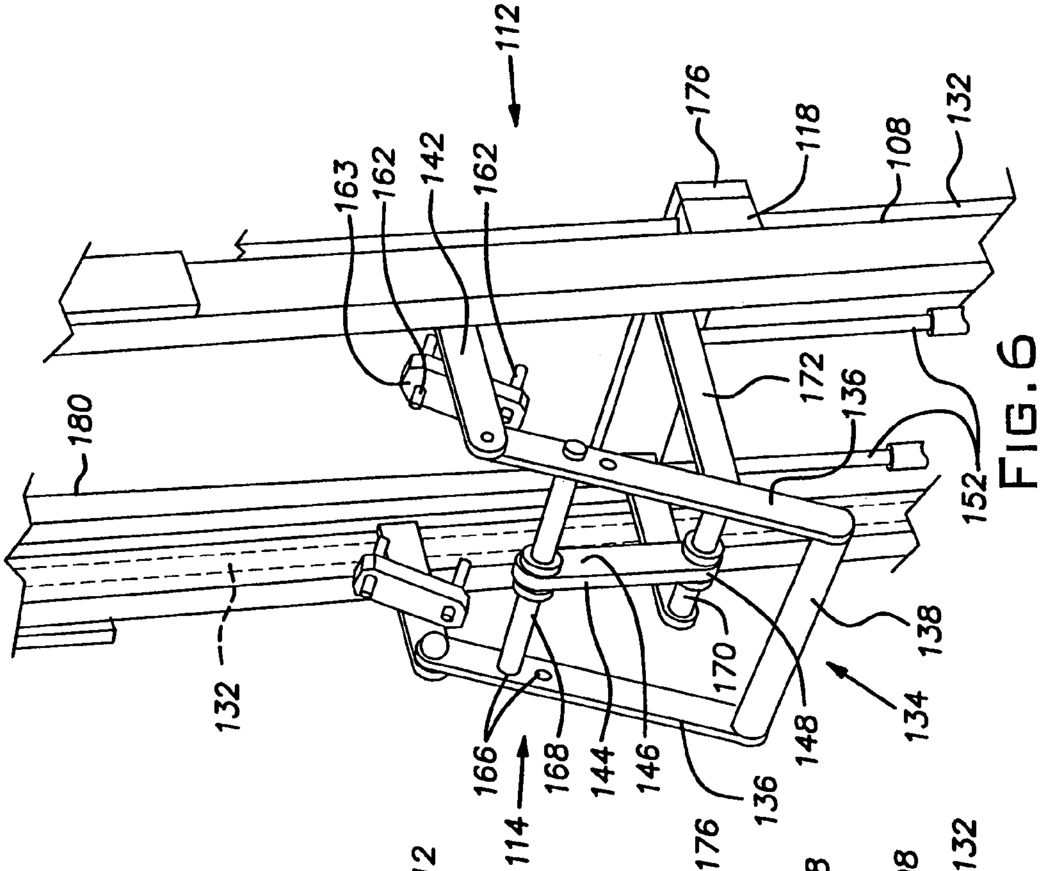
FIG. 6 is an enlarged perspective view of the lifting mechanism of the door lifting apparatus according to the present invention in a lowered position.
Figure 5:
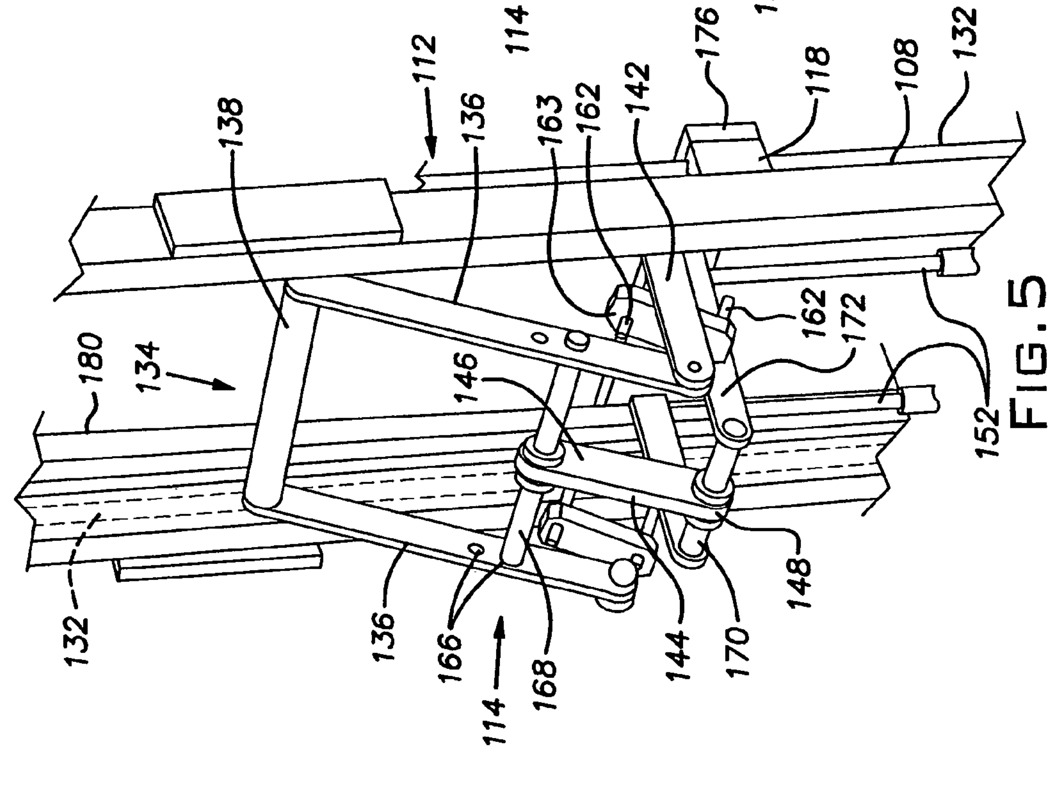
FIG. 5 is an enlarged perspective view of a lifting mechanism of the door lifting apparatus according to the present invention in the lifted position.

As shown best in FIGS. 2, 5, and 6, a plate 163 is rigidly secured, such as by welding, to each of the first brackets 142 at a location slightly rearward of the upright supports 108. The plate 163 has set screws 162 threadably secured therethrough and extending therefrom. The set screws 162 are adjustable so as to vary or alter the length or distance the screws project from the plate 163. The screws 162 serve as a stop to limit movement of the handle 134 toward the frame 104, as will be apparent from the following.

The lift mechanism 110 includes a slide 112 and a lever 114. The slide 112 includes a cushioning bar 176, a door support beam 178, an upper horizontal bar 179, and vertical bars 180. The vertical bars 180 rigidly interconnect the cushioning bar 176 and the upper horizontal bar 179. The vertical bars 180 are preferably oriented substantially parallel to, and laterally inset from, the upright supports 108, while the horizontal bar 179 and the cushioning bar 176 are oriented generally perpendicular to the vertical bars 180 and parallel to each other and to the cross bar 124. The upper horizontal bar 179 extends between upper ends of the vertical bars 180. The door support beam 178 is adjustably connected to the horizontal bar 179, as described hereinafter, and moves vertically with the rest of the slide 112.

The door support beam 178 extends laterally outboard of the upright supports 108 such that ends of the door support beam 178 are spaced laterally from the upright supports 108. The cushioning bar 176 and the upper horizontal bar 179 have a length such that ends of the cushioning bar 176 and the upper horizontal bar 179 are disposed over the front face 130 of the upright supports, as illustrated.

With reference to FIG. 3, the door support beam 178 has holders 116 secured adjacent each end thereof. As will be apparent by comparing FIGS. 1 and 2, the holders 116 are preferably disposed in a location laterally outboard of the upright supports 108 and generally aligned with the support bars 122 while being inset from the casters 126. The holders 116 are positioned and adapted to extend through openings 154 in the door 120, and to support the door 120 as it is lifted and lowered. The holders 116 may be repositioned along the length of the door support beam 178 to accommodate door openings 154 that are at varying distances from one another. The beam 178 is preferably attached to the horizontal bar 179 by bolts that extend through slotted holes in the horizontal bar 179 so as to allow for angular adjustment of the beam 178 relative to the horizontal bar, as shown best in FIG. 1*a*, to accommodate door openings 154 that are at varying heights.

In use, when the door 120 is being supported by the holders 116, the door rests against the cushioning bar 176, which thus serves to laterally support the door 120 to prevent the door 120 from swinging while hanging from the holders 116. Counterbalancing is further provided by the offset of the upright supports 108 relative to the middle of the base 106, as shown best in FIG. 2, so as to provide a stable support for the door 120.

With reference to FIGS. 5 and 6, a pair of second brackets 172 have proximal ends rigidly affixed to the vertical bars 180 and distal ends that are interconnected by a second bar 170, for purposes that will be apparent from the following description. The second brackets 172 thus extend rearwardly from the vertical bars 180 and the cushioning bar 176, and the second brackets' distal ends are disposed at a location that is rearward of the distal ends of the first brackets 142.

A plurality of glides 118 slidably secure the slide 112 to the rails 132. A first pair of glides 118 is affixed to the horizontal bar 179 while a second, substantially identical pair of glides 118 is affixed to the cushioning bar 176 (FIG. 2). The glides 118 guide the slide 112 as the slide 112 is moved vertically along the rails 132 relative to the upright supports 108, and are preferably formed from a low friction, wear resistant material. Accordingly, the slide 112, as defined by the door support beam 178, cushioning bar 176, vertical bars 180, horizontal bar 179, second brackets 172, and second bar 170 define a unitary framework that is slidably movable along the rails 132 relative to the upright supports 108. In this regard, the glides 118 may also be considered to be part of the slide 112.

Figure 1A:
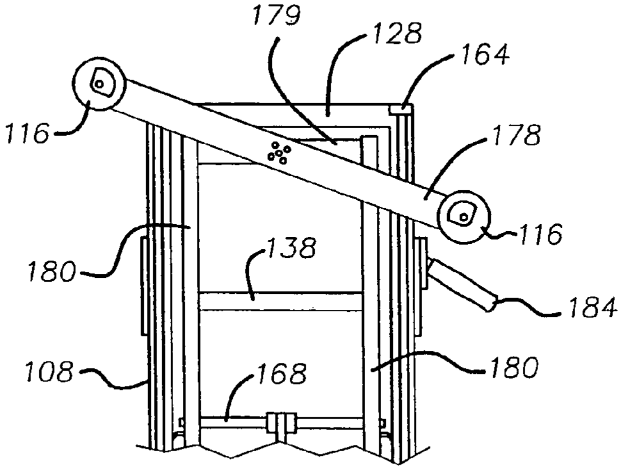
FIG. 1*a* is an enlarged front elevational view of a portion of the door lifting apparatus with a door support beam in an angled position.

As shown in FIGS. 1 and 4, a biasing device 152 extends between the lower support 182 of the frame 104 and the second brackets 172 of the slide 112 and assists in lifting and lowering the door 120 by exerting an upward force on the slide 112. The biasing device 152 may be formed from air springs or constant-force mechanical springs. The biasing force provided by the biasing device 152 helps to support the slide 112 when the door lifting apparatus 102 engages a door 120, and allows the door 120 to be raised and lowered with less effort by the operator.

As shown best in FIGS. 5 and 6, the lever assembly includes a handle 134 and a link arm 144. The handle 134 includes a pair of legs 136, a grip 138, and a first rod 168. Each leg 136 has a distal end affixed to one end of the grip 138 and a proximal end pivotally secured to one of the first brackets 142. The first rod 168 extends between and interconnects the handle legs 136 at a location relatively close to the legs' proximal ends. In the illustrated and preferred embodiment, the first rod 168 extends through openings 166 formed in each leg 136. Preferably, a plurality of openings 166 is formed in each leg 136, as illustrated, so that the first rod 168 can be repositioned to adjust the amount of vertical movement of the slide 112.

The link arm 144 has a first end 146 rotatably secured to the first rod 168 and a second end 148 rotatably secured to the second rod 170. Preferably, bearings or bushings are provided between the link arm 144 and the first rod 168 and between the link arm 144 and the second rod 170 to reduce friction during rotation of the link arm 144 relative to the first and second rods 168, 170.

A method for using the aforementioned apparatus for supporting the door 120 as it is removed from a vehicle will hereinafter by described. According to the method, the lever 114 is operated to move the slide 112 into an insertion position in which the holders 116 are aligned with the openings 154 formed in the door 120. Naturally, the angular orientation of the door support beam 178 relative to the horizontal bar 179 and, hence, the vertical position of the holders 116, will be adjusted beforehand to permit alignment of the holders 116 with the door openings 154. The insertion position is an intermediate position in which the handle is between the lifted position (FIG. 5) and the lowered position (FIG. 6) and, preferably, is a position in which the handle 134 is rearwardly extending and at an angle between horizontal and vertical.

Once the holders 116 are aligned with the door openings 154, the holders 116 are inserted into the door openings 154, and the handle 134 of the lever 114 is pivoted toward the frame 104 so as to move the slide 112 vertically upward from the insertion position to the lifted position (FIGS. 3 and 5). Since the handle 134 is rotated past vertical in the lifted position, the weight of the door 120 prevents the handle 134 from rotating away from the frame, and there is no risk of the handle accidentally rotating from the lifted position (FIG. 5) to the lowered position (FIG. 6).

Once moved into the lifted position, the door hinge pins 204 (FIG. 3) may be removed from the door hinges 202 while the door lifting apparatus 102 supports the door 120. Thereafter, the door 120 may be removed from the vehicle 200 and transported (i.e., pushed/pulled) to a desired location. A guidance handle 184 attached to the upright support 108, as shown in FIGS. 1 and 4, provides a suitable gripping surface for an operator to guide the door lifting and transporting apparatus 102. Naturally, the guidance handle 184 may be attached to other portions of the frame 104 or the slide 112, and additional guidance handles may also be provided.

Once the door 120 is at the desired destination, the operator may lower the door 120, for example onto a support platform, by pivoting the lever 114 downwardly and thereby moving the slide 112 vertically downward from the lifted position into the lowered position (i.e., from the position of FIG. 5 to the position of FIG. 6). With the door placed upon and supported by the support platform, the apparatus 102 may be pulled away from the support platform so as to withdraw the holders 116 from the door openings 154, and thereby disengage the door 120 from the door lifting and transporting apparatus 102.

As will be apparent to those skilled in the art, during movement of the handle 134 from the lifted position toward the lowered position, the first end 146 of the link arm 144, which is rotatably secured to the first rod 168, is first moved away from the frame 104 and then moved back toward the frame. During this movement of the first end 146 of the link arm 144, the second end 148 of the link arm 144, and the second brackets 172 associated therewith, are forced to move downwardly. Downward movement of the second brackets 172 causes the cushioning bar 176, support beam 178, and holders 116, together with the door 120 disposed thereon, to move downwardly as the glides 118 slide downwardly over the rails 132. Similarly, when the handle 134 is pivoted from the lowered position toward the lifted position, the link arm 144 applies an upward force on the second brackets 172 and, hence, the cushioning bar 176 and support bar 178, thereby forcing the slide to move upwardly as the glides 118 slide upwardly over the rails 132.

As the slide 112 is moved downwardly, the biasing device 152 applies an upward force on the slide 112 and thereby helps to support the weight of the door 120 as the door is lowered. Similarly, as the slide 112 is moved upwardly, the biasing device 152 applies an upward force on the slide 112 and thereby assists in raising the slide 112.

The door lifting and transporting apparatus according to the present invention is preferably formed from a durable material such as steel. Portions of the door lifting and transporting apparatus may be formed from other materials. For example, the handle 134 may be provided with a cushioning material. The holders 116 may be formed of a thermoplastic material to reduce noise and prevent damage to the door. The cushioning bar 176, against which a lifted door rests, may also be provided with a cushioning material for the similar reasons.

Although the present invention has been described hereinbefore with particularity, the present invention is not limited thereto. Rather, it is considered apparent that the method of the present invention is capable of numerous modifications, replacements of steps, and rearrangements of steps without departing from the scope and spirit of the invention as defined in the claims appended hereto.

What is claimed is:

1. A door lifting and transporting apparatus, comprising:

a frame comprising a base and a pair of upright supports; and, a lift mechanism comprising a slide, a lever and a plurality of glides, the slide comprising a plurality of holders, the holders being operable to engage and support a door and the glides being operable to guide the slide as the slide is moved vertically relative to the upright supports;

wherein the lever comprises a U-shaped handle having a pair of legs and a grip, and wherein each leg has a distal end pivotally secured to a first bracket that extends from one of the upright supports and wherein the lever is pivotally movable between plural positions and operably associated with the slide such that pivotal movement of the lever causes the slide to move vertically relative to the upright supports.

2. The apparatus according to claim 1, further comprising a link arm, said link arm having a first end and a second end, said first end being rotatably secured to the handle and said second end being rotatably secured to said slide.

3. A door lifting and transporting apparatus, comprising:

a frame comprising a base and a pair of upright supports each upright support having a front face along which a rail extends;

a lift mechanism comprising a slide, a lever and a plurality of glides, the slide comprising a plurality of holders, the holders being operable to engage and support a door and the glides being affixed to the slide and slidably secured to the rails, said glides cooperating with the rails to guide the slide as the slide is moved vertically relative to the upright supports; and a biasing device extending between the frame and the slide and serving to assist in raising and lowering the slide; and wherein the lever comprises a U-shaped handle having a pair of legs and a grip, each leg has a distal end pivotally secured to a first bracket extending from the an associated one of the upright supports and wherein the lever is pivotally movable between plural positions and operably associated with the slide such that pivotal movement of the lever causes the slide to move vertically relative to the upright supports.

4. The apparatus according to claim 3, further comprising a link arm, said link arm having a first end and a second end, said link arm first end being rotatably secured to the handle and said link arm second end being rotatably secured to the slide.

5. A door lifting and transporting apparatus, comprising:

a frame comprising a base and a pair of upright supports each upright support having a front face along which a rail extends;

a lift mechanism comprising a slide, a lever and a plurality of glides, the slide comprising a plurality of holders, the holders being operable to engage and support a door and the glides being affixed to the slide and slidably secured to the rails, said glides cooperating with the rails to guide the slide as the slide is moved vertically relative to the upright supports; and a biasing device selected from a group consisting of air springs and mechanical springs, the biasing device extending between the frame and the slide and serving to assist in raising and lowering the slide;

wherein the lever is pivotally movable between plural positions and operably associated with the slide such that pivotal movement of the lever causes the slide to move vertically relative to the upright supports.

* * * * *